(No Model.)

W. R. GREINER.
EGG CRATE.

No. 387,227. Patented Aug. 7, 1888.

WITNESSES
Wm. F. Lowe.
Alfred Jonghmans.

INVENTOR.
W. R. Greiner.
by his attorneys.
Roeder & Briesen

UNITED STATES PATENT OFFICE.

WILLIAM R. GREINER, OF MARLBOROUGH, NEW YORK.

EGG-CRATE.

SPECIFICATION forming part of Letters Patent No. 387,227, dated August 7, 1888.

Application filed February 24, 1888. Serial No. 265,142. (No model.)

*To all whom it may concern:*

Be it known that I, WILLIAM R. GREINER, of Marlborough, Ulster county, New York, have invented a new and Improved Egg-Crate, of which the following is a specification.

This invention relates to an egg-crate in which the eggs are held in position by two sets of crossing wires. These wires form yielding squares, embracing the eggs near their tips and ends, and firmly holding them in place.

The invention consists in the various features of improvement more fully pointed out in the claims.

Figure 2:
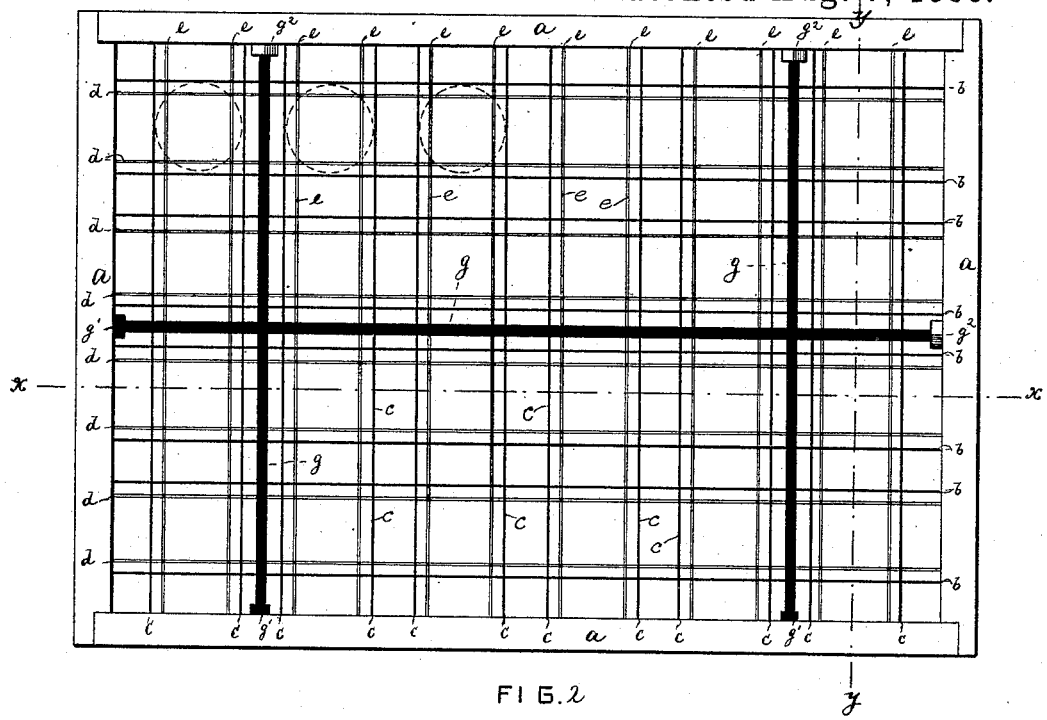
Figure 3:
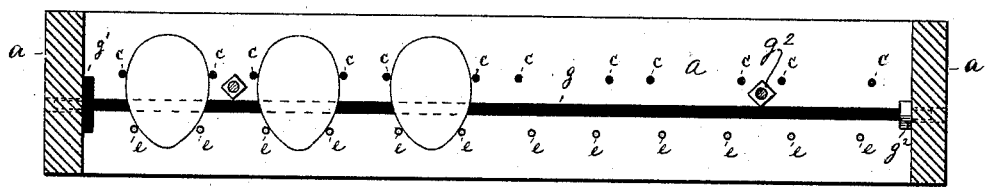
Figure 4:
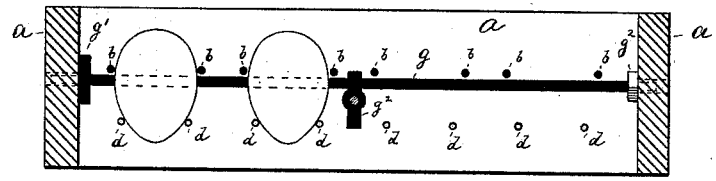
Figure 1:
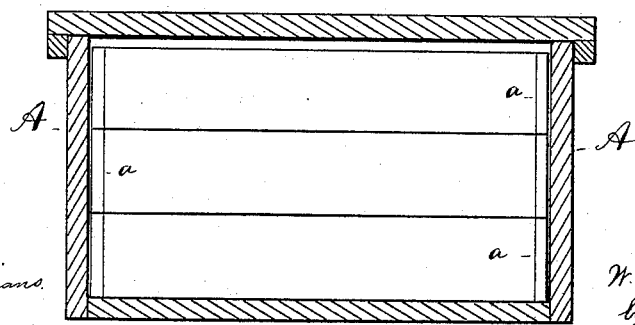

In the accompanying drawings, Figure 1 is a vertical section through a crate provided with a series of removable frames constructed according to my improvement, the frames being shown in elevation. Fig. 2 is a top view of one of such frames. Fig. 3 is a vertical longitudinal section on line $x\,x$, Fig. 2; and Fig. 4, a vertical transverse section on line $y\,y$, Fig. 2.

The letters $a\,a$ represent a number of square frames of wood or other suitable material, and adapted to be superposed within a box, A, the whole constituting an egg-crate. Across each frame $a$ there are stretched two sets of wires, forming two sets of square openings beneath one another. The uppermost set of wires is indicated by the full black lines $b\,c$ in Fig. 2. The longitudinal wires $b\,b$ of this set are so placed that they form alternately wide and narrow spaces, and the crossing transverse wires $c\,c$ are similarly placed. In this way the frame $a$ will be spanned by a set of wires that form a series of squares separated from one another by a set of narrow rectangular figures.

The set of lowermost wires (indicated each by a double line in Fig. 2) is arranged similarly to the uppermost set of wires—that is to say, the longitudinal wires $d\,d$ and transverse wires $e\,e$, crossing each other, form a set of squares separated by narrow rectangular figures; but the squares of the lowermost set are considerably smaller than those of the uppermost set, and the separating rectangular figures are therefore correspondingly larger. Each square of the uppermost set is directly above a square in the lowermost set, and thus an egg placed into one of the upper squares will be received with its tip by the corresponding lower square.

The eggs, on being introduced into the crate, will spread the wires, such spreading being permitted by the rectangular spaces between the squares. In this way, when the crate is filled or partially filled, the eggs will be securely held in place without interfering with one another.

$g\,g$ are a set of braces that prevent the frames $a$ from collapsing under the strain of the wires. These braces $g$ are placed, preferably, midway between the two sets of wires, Fig. 3, and they traverse the rectangular figures between the squares, Fig. 2. In this way the braces do not take up any room that is needed for the eggs. Each brace has a shoulder, $g'$, at one end, while its screw-threaded other end carries a nut, $g^2$. The shoulder $g'$ and nut $g^2$ bear against the inner edges of frame $a$. By turning the nut $g^2$ the frame may be spread.

The advantages of this crate are numerous. The eggs are securely held in place without crowding. The frames may be placed when out of the crate at any inclination without losing their charge. Moreover, the crate A may be readily filled with sawdust after all the frames and eggs are in place, as the sawdust will drop through the open meshes.

What I claim is—

1. The combination of frame $a$ with two sets of crossing wires arranged beneath one another, the wires in each set forming alternate squares and rectangular figures, and with braces $g$, traversing the rectangular figures between the squares, substantially as specified.

2. The combination of frame $a$ with two sets of crossing wires, $b\,c$ and $d\,e$, and with the braces $g$, having shoulders $g'$ and nuts $g^2$, substantially as specified.

WILLIAM R. GREINER.

Witnesses:
S. W. STILWELL,
GEO. S. CARPENTER.